(12) United States Patent
Jun (10) Patent No.: US 11,509,799 B2
(45) Date of Patent: Nov. 22, 2022

(54) CAMERA MODULE

(71) Applicant: Samsung Electro-Mechanics Co., Ltd, Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 19 days.

(21) Appl. No.: 17/213,586

(22) Filed: Mar. 26, 2021

(65) Prior Publication Data

US 2022/0086311 A1 Mar. 17, 2022

(30) Foreign Application Priority Data

Sep. 17, 2020 (KR) ........................ 10-2020-0120007

(51) Int. Cl.
*H04N 5/225* (2006.01)
*H04N 5/232* (2006.01)
*H04M 1/02* (2006.01)

(52) U.S. Cl.
CPC ........ *H04N 5/2252* (2013.01); *H04M 1/0264* (2013.01); *H04N 5/2254* (2013.01)

(58) Field of Classification Search
CPC ......... G03B 2205/0076; H04N 5/2254; H04N 5/23248
USPC ............................................ 348/208.99, 373
See application file for complete search history.

(56) References Cited

U.S. PATENT DOCUMENTS

| 8,660,420 B2 | 2/2014 | Chang |
| 8,982,274 B2 | 3/2015 | Kang et al. |
| 2011/0091193 A1 | 4/2011 | Lim et al. |
| 2014/0028906 A1* | 1/2014 | Chen ........................ G03B 5/00 348/375 |
| 2017/0285443 A1* | 10/2017 | Hu ........................... G02B 7/04 |
| 2018/0149824 A1* | 5/2018 | Kim .................... H04N 5/23287 |
| 2018/0239161 A1* | 8/2018 | Seol ...................... G02B 27/646 |
| 2020/0073200 A1 | 3/2020 | Eom |

FOREIGN PATENT DOCUMENTS

| JP | 2015-114484 A | 6/2015 | |
| KR | 10-1044219 B1 | 6/2011 | |
| KR | 10-2020-0002024 A | 1/2020 | |
| KR | 10-2020-0024496 A | 3/2020 | |
| KR | 10-2019-0121043 * | 5/2020 | ............. H04N 5/232 |
| KR | 10-2106525 B1 | 5/2020 | |
| WO | WO 2018/203173 A1 | 11/2018 | |

OTHER PUBLICATIONS

Indian First Examination report dated Mar. 31, 2022 in corresponding Indian Patent Application No. 202114013471.
Korean Office Action dated Jul. 7, 2021 in counterpart Korean Patent Application No. 10-2020-0120007 (12 pages in English and 7 pages in Korean).

* cited by examiner

*Primary Examiner* — Anthony J Daniels
(74) *Attorney, Agent, or Firm* — NSIP Law (57) ABSTRACT

A camera module includes a first rotation case configured to rotate in the fixed case around a first axis, a second rotation case configured to rotate in the first rotation case around a second axis, perpendicular to the first axis, a sub-module fixed in the second rotation case, a first shape memory alloy driving wire connected to the first rotation case, and a second shape memory alloy driving wire connected to the second rotation case.

24 Claims, 9 Drawing Sheets

CAMERA MODULE

CROSS-REFERENCE TO RELATED APPLICATION(S)

This application claims the benefit under 35 USC § 119(a) Korean Patent Application No. 10-2020-0120007 filed on Sep. 17, 2020 in the Korean Intellectual Property Office, the entire disclosure of which is incorporated herein by reference for all purposes.

BACKGROUND

1. Field

The following description relates to a camera module.

2. Description of Related Art

Cameras have been provided in portable electronic devices such as smartphones, table PCs, notebook computers, and the like, and an autofocusing function, an optical image stabilization function, a zoom function, and the like, may be added to cameras in mobile terminals, for example.

However, in order to implement various functions, typically the structure of camera modules becomes complicated, and the size thereof increases, and as a result, the size of the portable electronic devices in which the camera module is mounted also increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a fixed case, a first rotation case configured to rotate in the fixed case around a first axis, a second rotation case configured to rotate in the first rotation case around a second axis, perpendicular to the first axis, a sub-module fixed in the second rotation case, a first shape memory alloy driving wire connected to the first rotation case, and a second shape memory alloy driving wire connected to the second rotation case.

One end of the first shape memory alloy driving wire may be connected to a first connection member on an inner surface of the fixed case, and another end of the first shape memory alloy driving wire may be connected to a second connection member on an outer surface of the first rotation case, and one end of the second shape memory alloy driving wire may be connected to a third connection member on an inner surface of the first rotation case, and another end of the second shape memory alloy driving wire may be connected to a fourth connection member on an outer surface of the second rotation case.

Two of the first shape memory alloy driving wires may be disposed to form a pair of first shape memory alloy driving wires on one surface of the first rotation case, and another two of the first shape memory alloy driving wires may be disposed to form another pair of first shape memory alloy driving wires on another surface of the first rotation case, and two of the second shape memory alloy driving wires may be disposed to form a pair of second shape memory alloy driving wires, respectively, on each of two sides of the first rotation case adjacent to the one surface and the other surface of the first rotation case.

The first connection member may include plural first connection members, including two of the first connection members being disposed on respective lower end portions of the inner surface of the fixed case, and another two of the first connection members being disposed on respective lower end portions of another inner surface of the fixed case, opposite the inner surface of the fixed case, and the second connection member may include plural second connection members, including two of the second connection members being disposed on a central portion of the outer surface of the first rotation case, and another two of the second connection members being disposed on a central portion of another outer surface of the first rotation case, disposed opposite the outer surface of the first rotation case.

The third connection member may include plural third connection members, including two of the third connection members being disposed on respective lower end portions of the inner surface of the first rotation case, and another two of the third connection members being disposed on respective lower end portions of another inner surface of the first rotation case, opposite the inner surface of the first rotation case, and the fourth connection member may include plural fourth connection members, including two of the fourth connection members being disposed on a central portion of the outer surface of the second rotation case, and another two of the second connection members being disposed on a central portion of another outer surface of the second rotation case.

The first connection member may include plural first connection members, including a 1-1 connection member disposed at a lower end portion of a first inner surface of the fixed case and disposed to oppose a first outer surface of the first rotation case, a 1-2 connection member disposed on the first inner surface and spaced apart from the 1-1 connection member, a 1-3 connection member disposed at a lower end portion of a second inner surface of the fixed case and disposed to oppose a second outer surface of the first rotation case, and a 1-4 connection member disposed on the second inner surface and spaced apart from the 1-3 connection member, and the second connection member may include plural second connection members, including a 2-1 connection member disposed in a central portion of the first outer surface of the first rotation case, a 2-2 connection member disposed adjacent to the 2-1 connection member on the first outer surface of the first rotation case, 2-3 connection member disposed in a central portion of the second outer surface of the first rotation case, and a 2-4 connection member disposed adjacent to the 2-3 connection member on the second surface of the first rotation case, where the first shape memory alloy driving wire may include plural first shape memory alloy driving wires, including a 1-1 shape memory alloy driving wire connected to the 1-1 connection member and the 2-1 connection member, a 1-2 shape memory alloy driving wire connected to the 1-2 connection member and the 2-2 connection member, a 1-3 shape memory alloy driving wire connected to the 1-3 connection member and the 2-3 connection member, and a 1-4 shape memory alloy driving wire connected to the 1-4 connection member and the 2-4 connection member.

The third connection member may include plural third connection members, including a 3-1 connection member disposed at a lower end portion of a first inner surface of the first rotation case and disposed to oppose a first outer surface of the second rotation case, the 3-2 connection member disposed to be spaced apart from the 3-1 connection member on the first inner surface of the first rotation case, the 3-3 connection member disposed at a lower end portion of a second inner surface of the first rotation case and disposed to oppose a second outer surface of the second rotation case, and the 3-4 connection member disposed to be spaced apart from the 3-3 connection member on the second inner surface of the first rotation case, and the fourth connection member may include plural fourth connection members, including a 4-1 connection member disposed in a central portion of the first outer surface of the second rotation case, a 4-2 connection member disposed adjacent to the 4-1 connection member on the first outer surface of the second rotation case, a 4-3 connection member disposed in a central portion of the second outer surface of the second rotation case, and a 4-4 connection member disposed adjacent to the 4-3 connection member on the second outer surface of the second rotation case, and the second shape memory alloy driving wire may include plural second shape memory alloy driving wires, including a 2-1 shape memory alloy driving wire connected to the 3-1 connection member and the 4-1 connection member, a 2-2 shape memory alloy driving wire connected to the 3-2 connection member and the 4-2 connection member, a 2-3 shape memory alloy driving wire connected to the 3-3 connection member and the 4-3 connection member, and a 2-4 shape memory alloy driving wire connected to the 3-4 connection member and the 4-4 connection member.

The camera module may further include a flexible circuit board connected to the first connection member, the second connection member, the third connection member, and the fourth connection member, and include an opening for preventing interference when the first or second rotation cases are controlled to rotate.

The first rotation case may be disposed on a first rotation shaft of the fixed case, and the second rotation case may be disposed on a second rotation shaft of the first rotation case.

The first rotation case may include a first protrusion provided with a first installation groove in which the first rotation shaft is disposed, and the second rotation case may include a second protrusion provided with a second installation groove in which the second rotation shaft is disposed.

The first rotation case may include a through-hole, and the second rotation shaft passes through the through-hole.

The sub-module may include a housing having an internal space, and a lens holder disposed in the housing.

The lens holder may be configured to change lens elevations within the housing.

In one general aspect, a camera module includes a fixed case having a plurality of first connection members respectively disposed on two opposing inner surfaces, a first rotation case configured to rotate in the fixed case around a first axis, having a plurality of second connection members on surfaces of the first rotation case that respectively oppose the plurality of first connection members, and having a plurality of third connection members including plural third connection members that are disposed on other surfaces of the first rotation case, a second rotation case configured to rotate in the first rotation case around a second axis, perpendicular to the first axis, and having a plurality of fourth connection members disposed on surfaces that respectively oppose the third connection members, a sub-module fixedly disposed on an inner surface of the second rotation case, a plurality of first shape memory alloy driving wires that respectively connect the plurality of first connection members and the plurality of second connection members, and a plurality of second shape memory alloy driving wires that respectively connect the plurality of third connection members and the plurality of fourth connection members.

Two of the first shape memory alloy driving wires may be disposed to form a pair of first shape memory alloy driving wires on one surface of the first rotation case, and another two of the first shape memory alloy driving wires may be disposed to form another pair of first shape memory alloy driving wires on another surface on an opposite side of the first rotation case than the one surface of the first rotation case, and two of the second shape memory alloy driving wires may be disposed to form a pair of second shape memory alloy driving wires, respectively, on each of two sides of the first rotation case adjacent to the one surface and the other surface of the first rotation case.

The camera module may further include a flexible circuit board respectively connected to the plurality of first connection members, the plurality of second connection members, the plurality of third connection members, and plurality of fourth connection members, and may include an opening for preventing interference when the first or second rotation cases are controlled to rotate.

The first rotation case may be disposed on a first rotation shaft of the fixed case, and the second rotation case may be disposed on a second rotation shaft of the first rotation case.

In one general aspect, a camera module includes a first case having a first rotation member configured in a first axis direction, a second case having a second rotation member configured in a different second axis direction, a third case including a lens sub-module, and plural shape memory alloy driving wires, including a first shape memory alloy wire configured to control varied rotation of the second case using the first rotation member, and a second shape memory alloy wire configured to control varied rotation of the third case using the second rotation member.

The camera module may further include a flexible circuit board configured to provide electrical changes to the first shape memory alloy wire that correspondingly changes a rotational orientation of the second case with respect to the first case about the first rotation member, and configured to provide electrical changes to the second shape memory alloy wire that correspondingly change rotational orientation of the third case with respect to the second case about the second rotation member.

The first shape memory alloy wire may control a rotational orientation of the second case with respect to the first case about the first rotation member, and the second shape memory alloy wire may control a rotational orientation of the third case with respect to the second case about the second rotation member, wherein the first shape memory alloy wire includes a plurality of first shape memory alloy wires that respectively connect first connection members arranged on an inner side of the first case to second connection members arranged on an outer side of the second case.

The second shape memory alloy wire may further include a plurality of second shape memory alloy wires that respectively connect third connection members arranged on an inner side of the second case to fourth connection members arranged on an outer side of the third case.

The first shape memory alloy wire may control a rotational orientation of the second case with respect to the first case about the first rotation member, and the second shape memory alloy wire may control a rotational orientation of the third case with respect to the second case about the second rotation member, where the second shape memory alloy wire may include a plurality of second shape memory alloy wires that respectively connect third connection members arranged on an inner side of the second case, to fourth connection members arranged on an outer side of the third case.

In one general aspect, a camera module includes a first case having a first rotation member configured in a first axis direction, and a first connection member disposed on an inner side of the first case, a second case having a second rotation member configured in a different second axis direction, a second connection member disposed on an outer side of the second case and opposing the first connection member, and a third connection member disposed on an inner side of the second case, a third case including a lens sub-module, and a fourth connection member disposed on an outer side of the third case and opposing the third connection member, and respective shape memory alloy wires that connect the first connection member to the second connection member, and connect the third connection member to the fourth connection member.

The first connection member may be disposed on two of a total of four inner sides of the first case, the second connection member may be disposed on two outer sides of the second case, the third connection member may be disposed on two inner sides of the second case, and the fourth connection member may be disposed on two outer sides of the third case.

The camera module may further include a flexible circuit board connected to the first connection member, the second connection member, the third connection member, and the fourth connection member.

The flexible circuit board may further include an opening for preventing interference when the second or third rotation cases are controlled to rotate with respect to the first case.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein. In addition, the use of the term "may" herein with respect to an example or embodiment (e.g., as to what an example or embodiment may include or implement) means that at least one example or embodiment exists where such a feature is included or implemented, while all examples are not limited thereto.

As noted above, in order to implement various functions, typically the structure of camera modules have become complicated, and the sizes thereof increased, and as a result, the size of the portable electronic devices in which the camera module is mounted also have increased.

Attempts to miniaturize and integrate the functions of existing general manual cameras, such as autofocusing (AF) and optical zoom, in addition to an existing OIS driving method, are being made, and as the structure diversifies accordingly, it has been found by the present inventors that there is, thus, a desire for OIS driving methods other than existing OIS methods, as well as alternative or additional features or capabilities, all as non-limiting examples.

Figure 1:
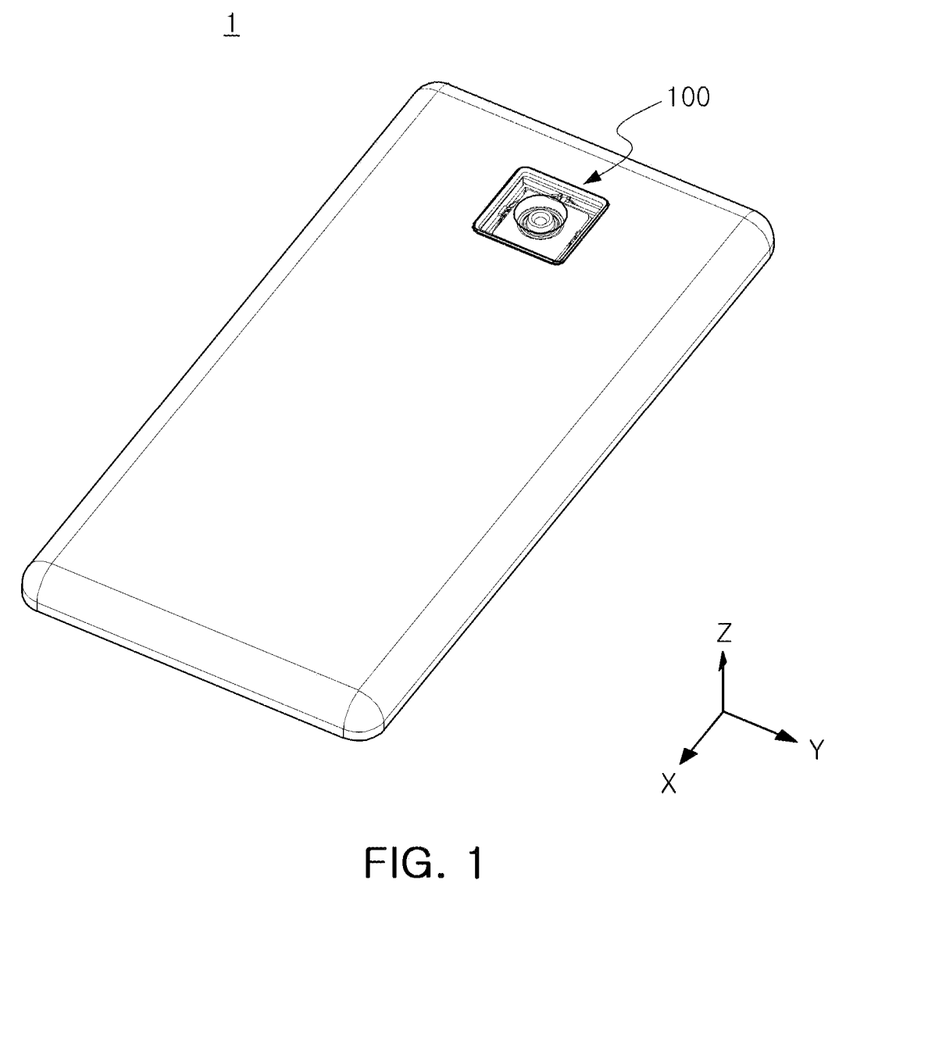
FIG. 1 is a perspective view of an example portable electronic device, in accordance with one or more embodiments.

FIG. 1 is a perspective view of an example portable electronic device, in accordance with one or more embodiments.

Referring to FIG. 1, a portable electronic device 1 according to one or more embodiments include a mobile communication terminal, a smartphone, a tablet PC, or the like, in various examples, in which a camera module 100 is mounted, as well as other camera module implementations.

As illustrated in FIG. 1, the camera module 100 is mounted in the portable electronic device 1 to capture an image, e.g., an image of a subject.

In one or more embodiments, the camera module 100 includes a plurality of lenses, for example with the illustrated optical axis (the Z-axis) of the lens being in a direction perpendicular to a thickness direction (the Y-axis direction, a direction from a front surface of the portable electronic device toward a rear surface thereof or vice versa) of the portable electronic device, as a non-limiting example.

In an example, a camera module 100 according to one or more embodiments may have at least one of AF, zoom, and OIS functions, as non-limiting examples.

For example, the camera module 100 having AF, zoom, OIS functions, and the like, may be provided with various components, so the size of such a camera module may typical increase compared to a general camera module without AF, zoom, and/or OIS functions, and the like. For example, in a general camera module, when the size of camera module increases, it may affect miniaturization of a portable electronic device in which such a camera module is mounted.

For example, in typical camera modules, the number of stacked lenses increases for a zoom function, and when multiple stacked lenses are formed in the thickness direction of such a portable electronic device, the thickness of the portable electronic device also increases according to the number of stacked lenses. Accordingly, typically, if the thickness of the portable electronic device is not increased, the number of stacked lenses cannot be sufficiently secured, and the zoom performance is weakened.

In addition, in order to implement the AF and OIS functions, typically an actuator moving a lens group in the optical axis direction or in a direction perpendicular to the optical axis is installed. When the optical axis (Z axis) of such a lens group is formed in the thickness direction of the portable electronic device, an actuator for moving the lens group may also be installed in the thickness direction of the portable electronic device. Therefore, typically, the thickness of the portable electronic device is increased.

However, the camera module 100 according to one or more embodiments may implement a OIS function through a driving wire made of a shape memory alloy, the portable electronic device 1 can be miniaturized over such typical portable electronic devices, e.g., even with example embodiments that implement lens groups.

Figure 2:
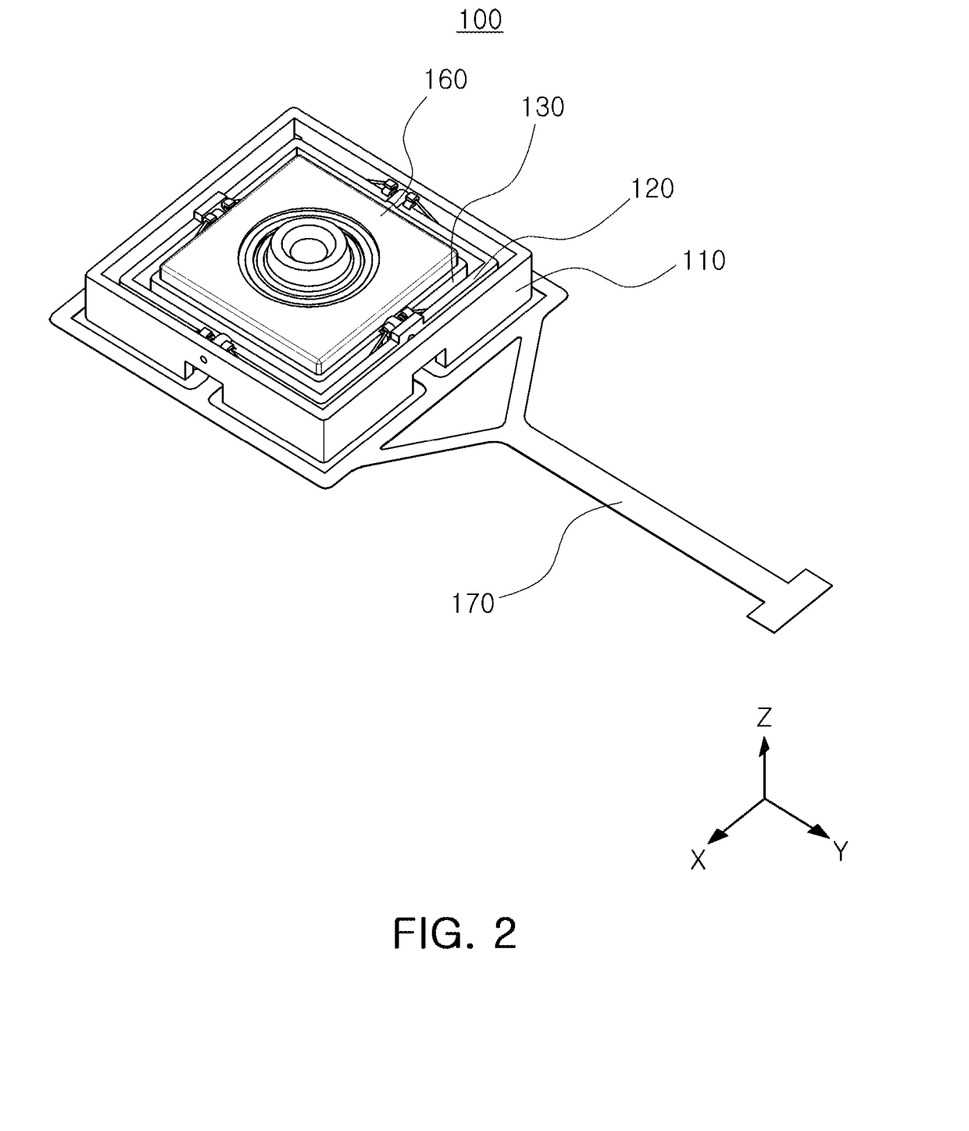
FIG. 2 is a schematic perspective view of an example camera module, in accordance with one or more embodiments.
Figure 3:
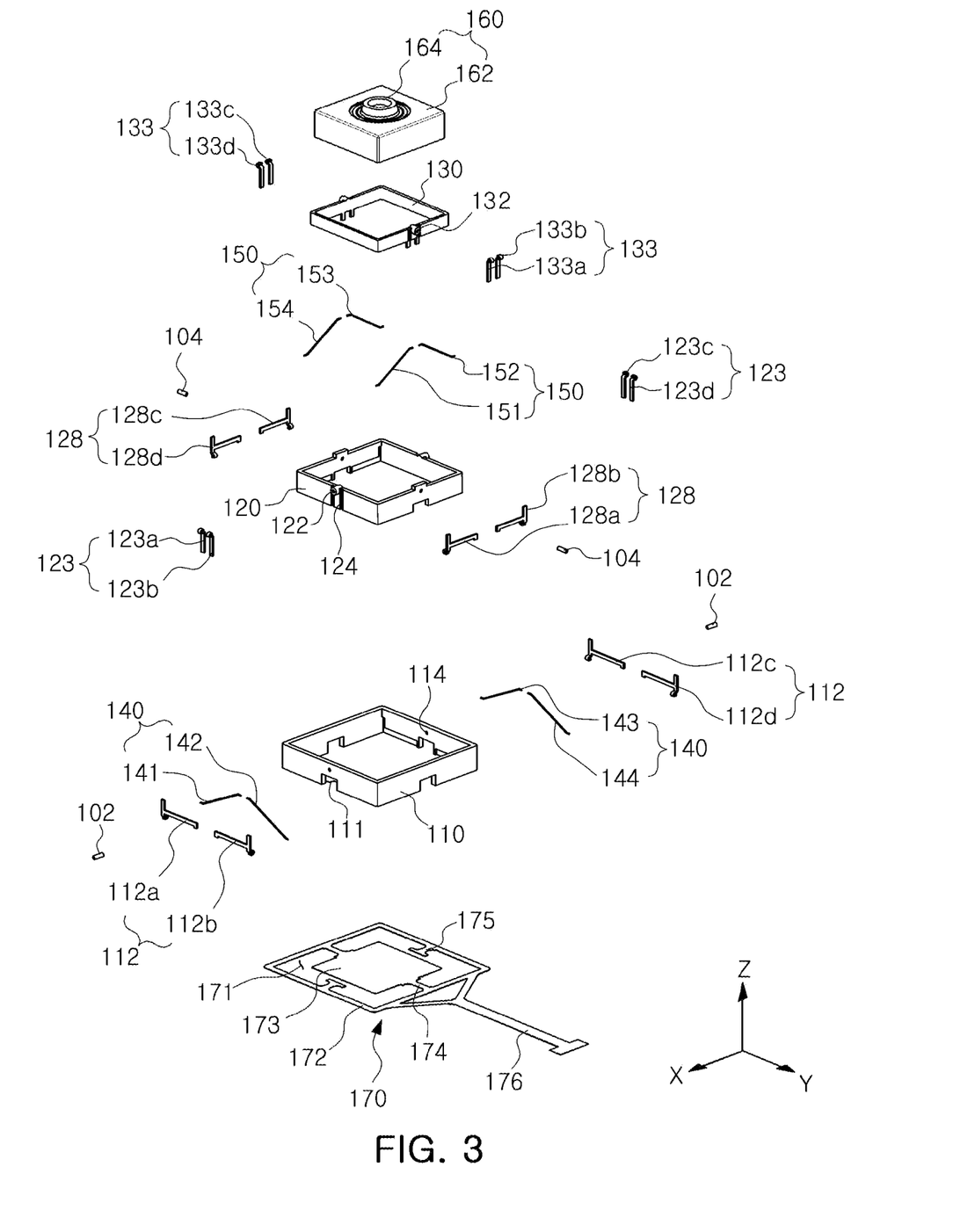
FIG. 3 is an exploded perspective view of an example camera module, in accordance with one or more embodiments.

FIG. 2 is a schematic perspective view of an example camera module, in accordance with one or more embodiments, and FIG. 3 is an exploded perspective view of an example camera module, in accordance with one or more embodiments.

Referring to FIGS. 2 and 3, the camera module 100 according to one or more embodiments may include a fixed case 110, a first rotating case 120, a second rotating case 130, and a first driving wire 140, a second driving wire 150, a sub-module 160, and a flexible circuit board 170, for example.

Figure 4:
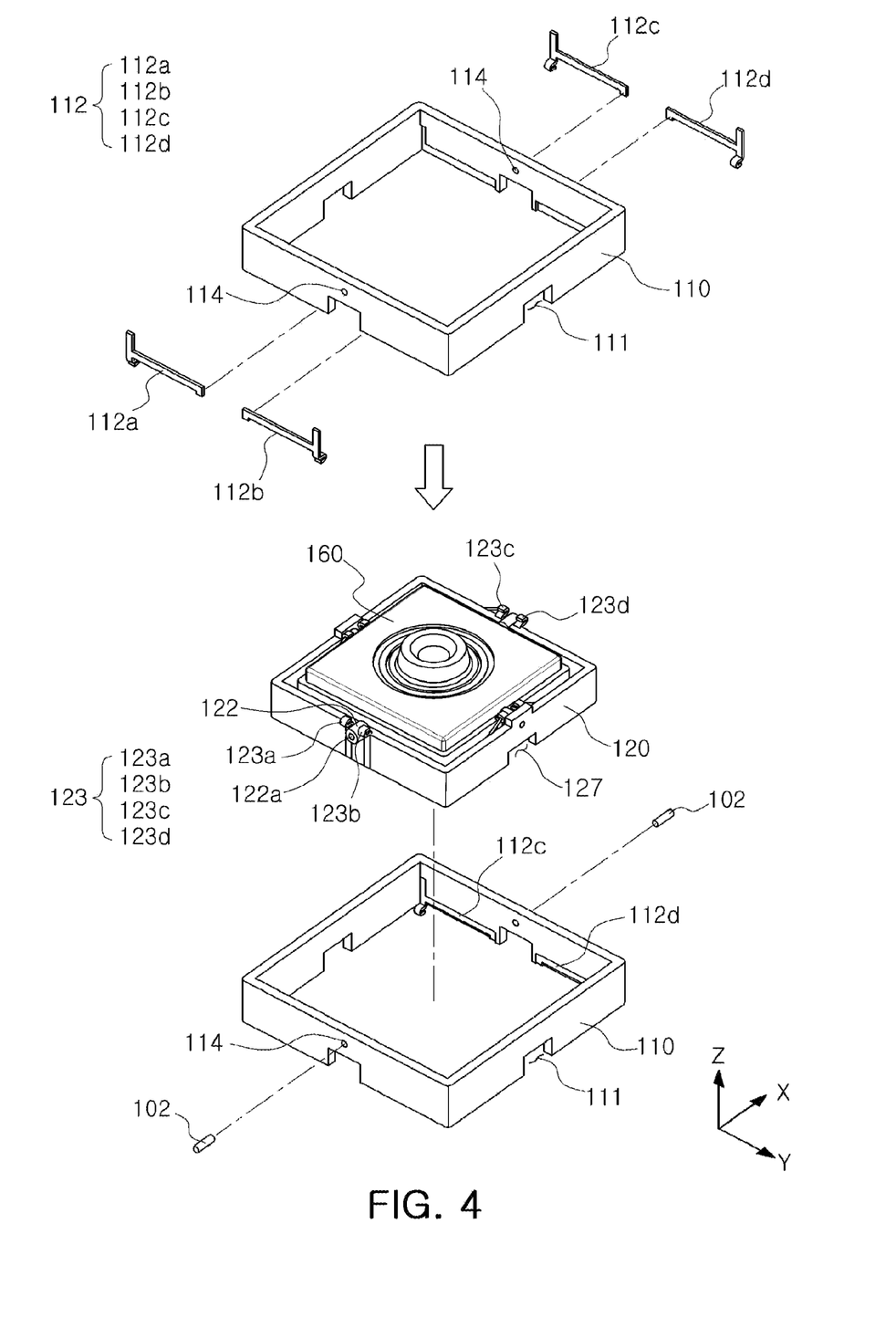
FIG. 4 is an exploded perspective view illustrating an example fixing case of an example camera module, in accordance with one or more embodiments.

The fixed case 110 may have a rectangular frame shape as shown in greater detail in FIG. 4, and a first interference prevention groove 111 for preventing interference with the flexible circuit board 170 may be provided in a center or central sections of each of the illustrated lower end portions of the four side surfaces of the rectangular frame. Meanwhile, a plurality of first connection members 112 to which corresponding first driving wires 140 are connected may be provided in the fixed case 110. For example, two first connection members 112 may be installed at end portions of one surface of inner surfaces of the fixed case 110 and another surface of the inner surfaces of the fixed case 110 opposite to the one surface.

As an example, the first connection member 112 may include a 1-1 connection member 112a installed at a lower end portion of one surface of an inner surface of the fixed case 110, and a 1-2 connection member 112b installed at another lower end portion of the inner surface of the fixed case 110, spaced apart from the 1-1 connection member 112a. The first connection member 112 may further include a 1-3 connection member 112c disposed at a lower end portion of another inner surface of the fixed case 110 opposite to the surface on which the 1-1 and 1-2 connection members 112a and 112b are installed, and a 1-4 connection member 112d disposed to be spaced apart from the 1-3 connection member 112c and installed on the same surface on which the 1-3 connection member 112c is installed, similar to or mirroring the relationship of the 1-1 and 1-2 connection members 112a and 112b.

The first connection member 112 may be electrically connected to the flexible circuit board 170, and thus each of the connection members 112a, 112b, 112c, and 112d may be in electrical connection with the flexible circuit board 170.

For example, as illustrated in FIGS. 3 and 4, the fixing case 110 may be provided with mounting holes 114 in which respective first rotational shafts 102 are installed on two sidewalls facing each other.

The first rotating case 120 may be rotatably installed in the fixed case 110 in first axis direction (e.g., X-axis direction, see FIG. 3). For example, the first rotating case 120 may be installed on/using the first rotation shafts 102 to rotate about the first rotation shafts 102.

Meanwhile, the first rotating case 120 may also have a rectangular frame shape, for example. The first rotating case 120 is provided with first protrusions 122 provided with first installation grooves/inlets 122a, with the first rotation shaft 102 being installed at outer surfaces of the corresponding two side walls of the first rotating case 120. For example, one end of each of the first rotation shafts 102 is insertedly installed in the respective mounting holes 114 of the fixed case 110 and the other end of each of the first rotation shafts 102 is insertedly installed in the respective first installation grooves/inlets 122a. Accordingly, the first rotation case 120 may be rotated around or about the first rotation shaft 102.

In addition, a second connection member 123 (see FIGS. 3 and 4) may be installed at both/opposing sides of each of the first protrusions 122. For example, the first rotation case 120 may be provided with respective first insertion grooves 124 into which each of the second connection members 123 is inserted and installed on both/opposing sides of the first protrusion 122. As an example, using respective first insertion grooves 124, two of the second connection members 123 may be installed in the central portion of an outer surface of the first rotation case 120 and installed in a central portion of another outer surface of the first rotating case 120.

For example, the second connection member 123 may include a 2-1 connection member 123a disposed in a central portion of one surface of the first rotating case 120 in one of the first insertion grooves 124, and a 2-2 connection member 123b disposed adjacent to the 2-1 connection member 123a in another one of the first insertion grooves 124 on either sides of a corresponding first protrusion 122. Likewise, the second connection member 123 may further include a 2-3 connection member 123c installed in a central portion of the other surface, disposed on an opposite side of the one surface of the first rotating case 120, in another one of the first insertion grooves 124, and a 2-4 connection member 123d disposed adjacent to the 2-3 connection member 123c in still another one of the first insertion grooves 124, e.g., similar to or mirroring the relationship of the 2-1 and 2-2 connection members 123a and 123b.

Figure 5:
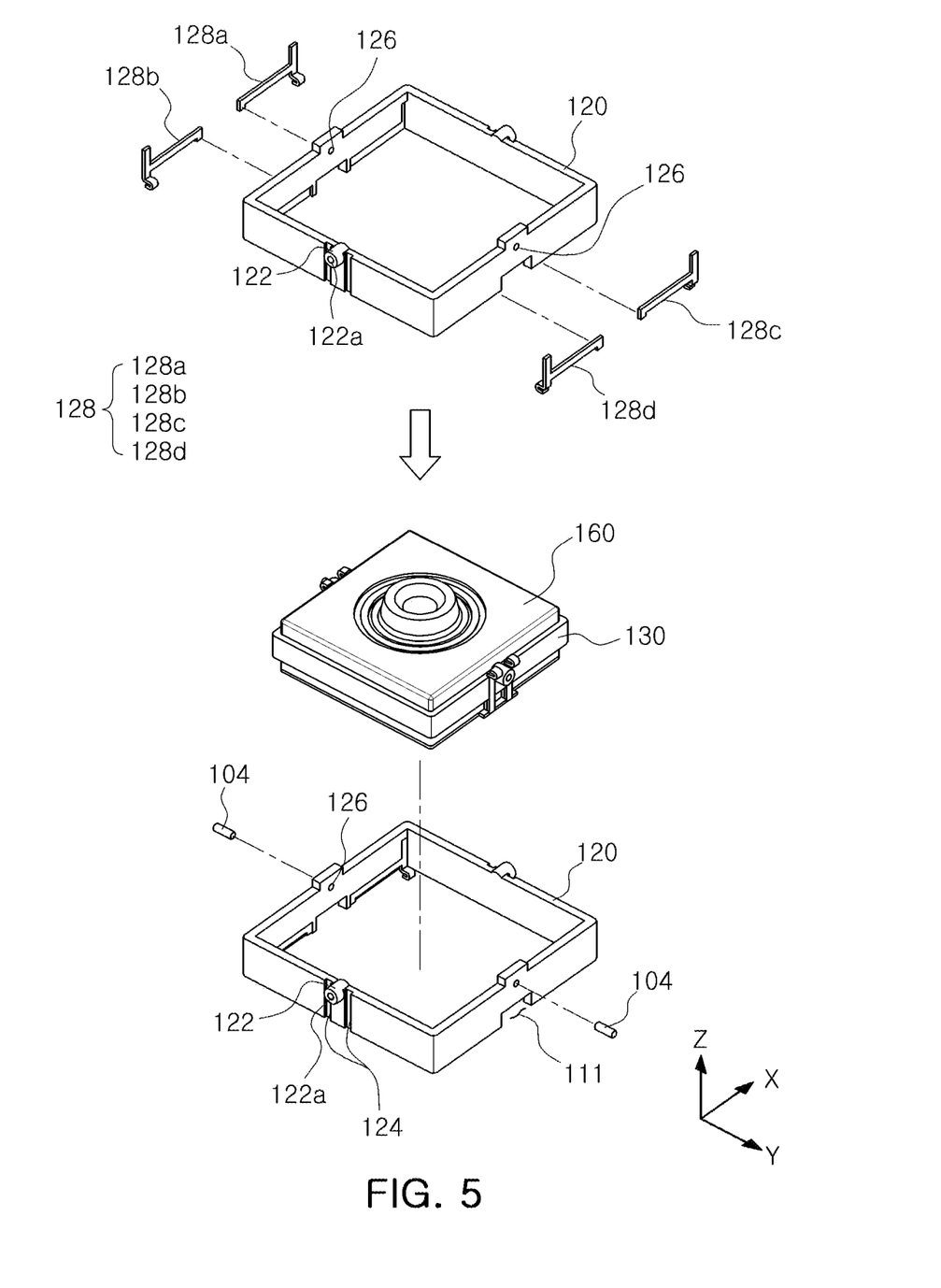
FIG. 5 is an exploded perspective view illustrating an example first rotating case of an example camera module, in accordance with one or more embodiments.

The first rotating case 120 may be provided with through-holes 126 that the second rotation shaft 104 are disposed to pass through, as described in greater detail further below. The through-holes 126 are formed in respective sidewalls of the first rotating case 120, other than the respective sidewalls on/in which the first protrusions 122 are disposed. A second interference prevention groove 127 for preventing interference with the flexible circuit board 170, for when the first rotating case 120 rotates, may be provided below the through-hole 126. Meanwhile, a third connection member 128 may be installed on respective inner surfaces of the first rotating case 120. As an example, two of the third connection members 128 may be installed at a lower end portion of an inner surface of the first rotating case 120 in which the through-hole 126 is formed.

As an example, the third connection member 128 may include a 3-1 connection member 128a disposed at a lower end portion of one surface of the inner surfaces of the first rotating case 120, and a 3-2 connection member 128b disposed to be spaced apart from the first 3-1 connection member and disposed at another lower end portion of the one surface of the inner surfaces of the first rotating case 120. The third connection member 128 may further include a 3-3 connection member 128c disposed at a lower end portion of another surface of the inner surfaces of the first rotating case 120, disposed opposite to the one surface where the 3-1 connection member 128a and the 3-2 connection member 128b are installed, and a 3-4 connection member 128d disposed to be spaced apart from the 3-3 connection member 128c and disposed at another lower end portion of the other surface of the first rotating case 120, similar to or mirroring the relationship of the 3-1 and 3-2 connection members 128a and 128b.

The second rotating case 130 is rotatably installed in the first rotating case 120 in a second axis direction (for example, a Y axis direction, see FIG. 3), perpendicular to the first axis direction (for example, a X axis direction, see FIG. 3). For example, the second rotating case 130 may be installed in the first rotating case 120 so as to be rotatable about the second rotation shafts 104. As an example, the second rotation case 130 may also have a rectangular frame shape, as shown in greater detail in FIG. 6. Meanwhile, the second rotating case 130 may be provided with second protrusions 132, each of the second protrusions 132 being provided to protrude from corresponding surfaces of the second rotating case 130. Each of the second protrusions 132 may be provided with a second installation groove or inlet 132a in which the respective second rotation shafts 104 of the first rotating case 120 are disposed.

Figure 6:
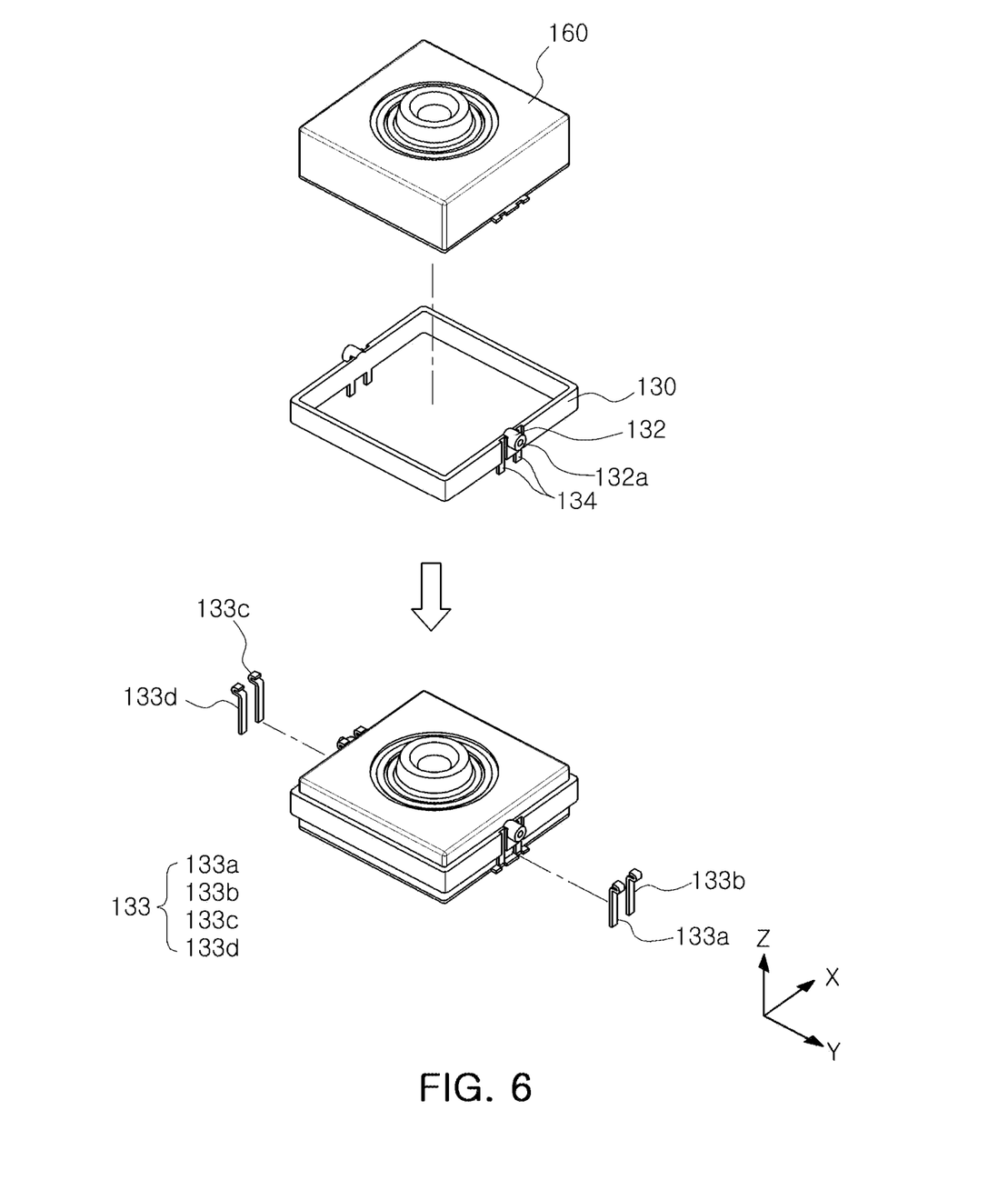
FIG. 6 is an exploded perspective view illustrating an example second rotating case of an example camera module, in accordance with one or more embodiments.

In addition, a fourth connection member 133 may be respectively installed on both sides of each of the second protrusions 132. To this end, the second rotating case 130 may be provided with respective second insertion grooves 134 into which the each of the fourth connection members 133 are respectively insertedly installed, i.e., along both sides of each of the second protrusions 132. For example, the fourth connection member 133 may include a 4-1 connection member 133a disposed in a central portion of one surface of the second rotating case 130, and a 4-2 connection member 133b disposed adjacent to the 4-1 connection member 133a. Thus, the 4-1 connection member 133a and the 4-2 connection member 133b are on both sides of the corresponding second protrusion 132. Similarly, the fourth connection member 133 may include a 4-3 connection member 133c installed in a central portion of another surface of the second rotating case 130, and a 4-4 connection member 133d disposed adjacent to the 4-3 connection member 133c, similar to or mirroring the relationship of the 4-1 and 4-2 connection members 133a and 133b.

Figure 7:
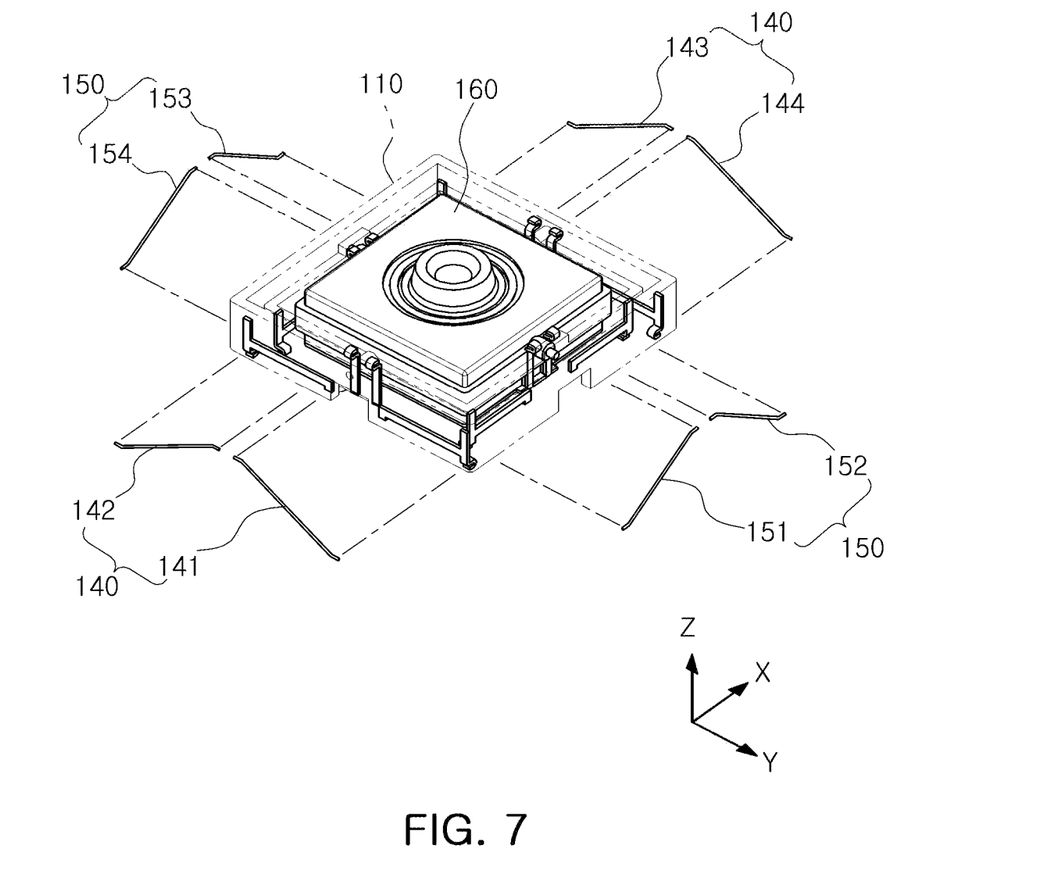
FIG. 7 is a diagram illustrating an installation state of example first and second driving wires of an example camera module, in accordance with one or more embodiments.

As illustrated in FIG. 7, each first driving wire 140 is connected to the first rotating case 120 and is made of a shape memory alloy. As an example, one end portion of each of the first driving wires 140 is respectively connected to the first connection member 112, and another end portion of each of the first driving wires 140 is respectively connected to the second connection member 123, as described above.

For example, as shown in FIG. 7, the first driving wire 140 may include a 1-1 driving wire 141 having one end connected to the 1-1 connection member 112a and the other end connected to the 2-1 connection member 123a, a 1-2 driving wire 142 having one end connected to the 1-2 connection member 112a and the other end connected to the 2-2 connection member 123b, a 1-3 driving wire 143 having one end connected to the 1-3 connection member 112c and the other end connected to the 2-3 connection member 123c, and a 1-4 driving wire 144 having one end connected to the 1-4 connection member 112d and the other end connected to the 2-4 connection member 123d. Accordingly, the first rotating case 120 is rotated about the first rotation shaft 102 by the respective and selective extension and contraction of the 1-1 to 1-4 driving wires 141 to 144.

The second driving wire 150 is connected to the second rotating case 130 and is made of a shape memory alloy. As an example, one end portion of each of the second driving wires 150 is respectively connected to the third connection member 128, and another end portion of each of the second driving wires 150 is respectively connected to the fourth connection member 133 described above. In an example, the first and second driving wires 140 and 150 may be respectively made/formed of the same shape memory alloy.

For example, as shown in FIG. 7, the second driving wire 150 may include a 2-1 driving wire 151 having one end connected to the 3-1 connection member 128a and the other end connected to the 4-1 connection member 133a, a 2-2 driving wire 152 having one end connected to the 3-2 connection member 128b and the other end connected to the 2-2 connection member 133b, a 2-3 driving wire 153 having one end connected to the 3-3 connection member 128c and the other end connected to the 4-3 connection member 133c, and a 2-4 driving wire 154 having one end connected to the 3-4 connection member 128d and the other end connected to the 4-4 connection member 133d. Accordingly, the second rotating case 130 is rotated about the second rotation shaft 104 by the respective and selective extension and contraction of the 2-1 to 2-4 driving wires 151 to 154.

The sub-module 160 may be fixedly installed in/on the second rotating case 130 and thus rotated in conjunction with the second rotating case 130. For example, as illustrated in FIG. 3, the sub-module 160 may include a housing 162 having an internal space and a lens holder 164 elevatably installed in the housing 162. As a further example, the lens holder 164 may include a plurality of lenses. In addition, the sub-module 160 may be further representative of including an AF driving unit configured to perform AF driving by controlling elevation of the lens holder 164. The AF driving unit may be formed of, for example, a magnet and a coil. The magnet and the coil are disposed opposite to each other, and any one of the magnet and the coil is installed on an inner surface of the housing 162, and the other one of the magnet and the coil is installed on an outer surface of the lens holder 164.

As discussed above and as illustrated in FIG. 8, flexible circuit board 170 is electrically connected to the first, second, third, and fourth connection members 112, 123, 128, and 133, described above, and has an opening 171 for preventing interference when the first and/or second rotating cases 120 and 130 rotate. As an example, the flexible circuit board 170 may include a frame portion 172 having a rectangular frame shape, a seating portion 173 disposed inside the frame portion 172 and having a rectangular shape, a connecting portion 174 connecting the seating portion 173 and the frame 172, a junction portion 175 formed to extend inwardly from both sides of the frame portion 172 on which the connecting portion 174 is not formed, and an extension portion 176 formed outwardly of the frame portion 172.

Figure 8:
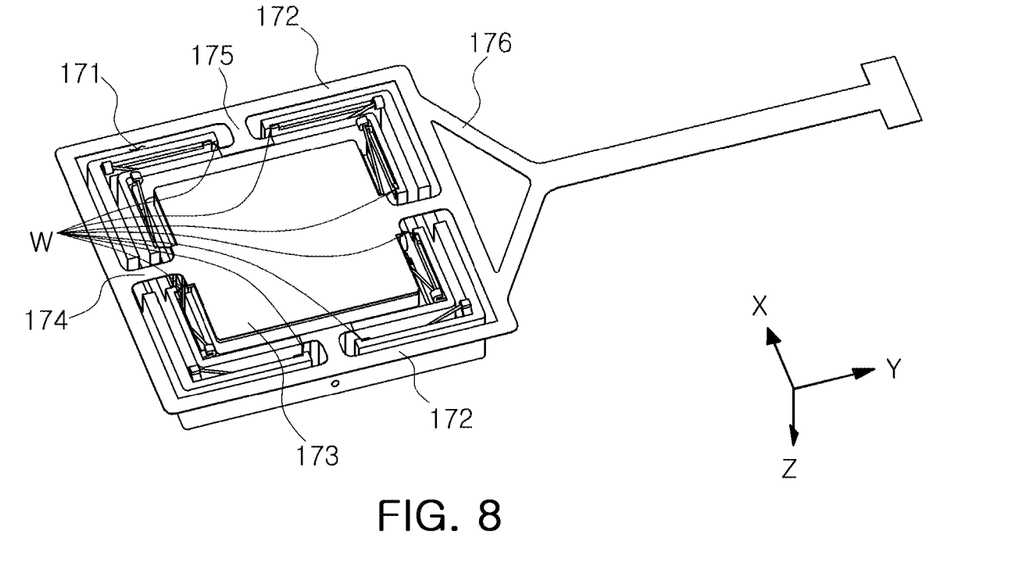
FIG. 8 is a diagram illustrating an electrical connection method between a flexible circuit board of a camera module and example first to fourth connection members, in accordance with one or more embodiments.

As an example, the first and third connection members 112 and 128 may be connected to the flexible circuit board 170 through a wire W. In addition, the second and fourth connection members 123 and 133 may be directly connected to the flexible circuit board 170.

As described above, the first and second rotating cases 120 and 130 may be rotated about the first and second rotation shafts 102 and 104 respectively through the first and second driving wires 140 and 150.

Accordingly, compared to previous approaches of using a driving unit with a coil and a magnet for OIS driving, in the configurations of one or more of the above examples interference with/from surrounding electronic components by electromagnetic waves can be prevented or reduced. Further, since driving force is improved, a rotational angle of the first and second rotating cases 120 and 130 may be increased, compared to the previous approaches, when the OIS is driven with the configurations of one or more of the above examples.

Furthermore, compared to the previous approaches where a driving unit with a coil and a magnet is used for OIS driving, the configurations of one or more of the above examples may have simpler structure with reduced manufacturing costs.

Figure 9:
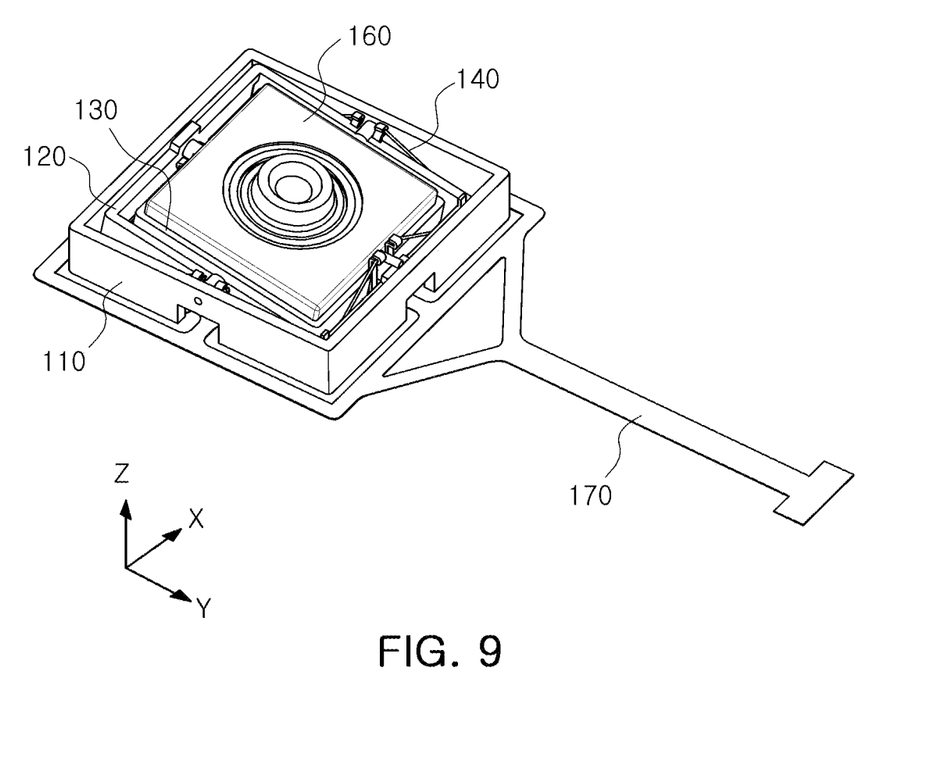
FIGS. 9 to 11 are diagrams illustrating example operations of an example camera module, in accordance with one or more embodiments.
Figure 10:
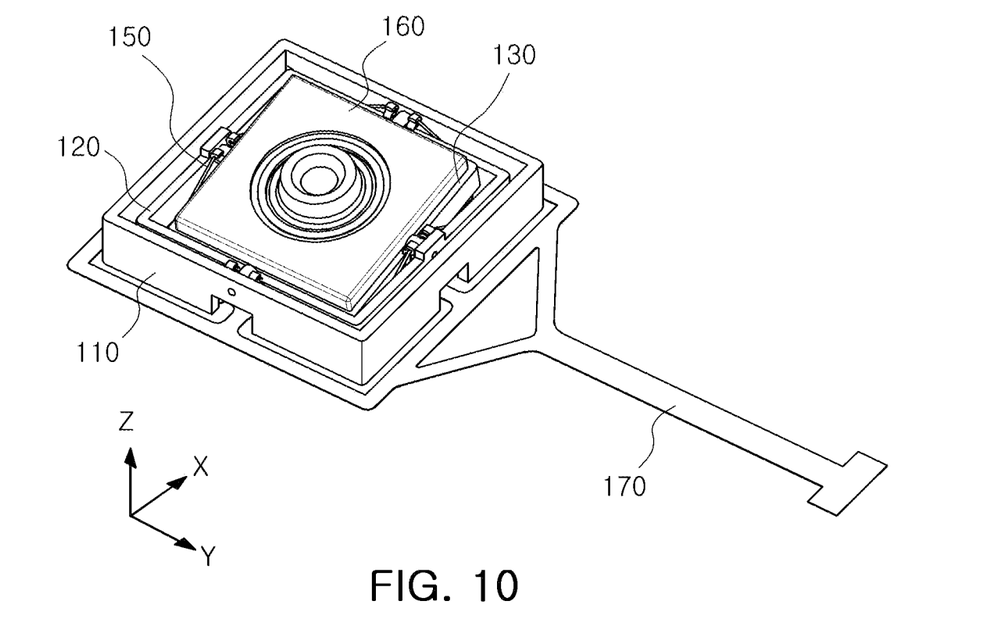
Figure 11:
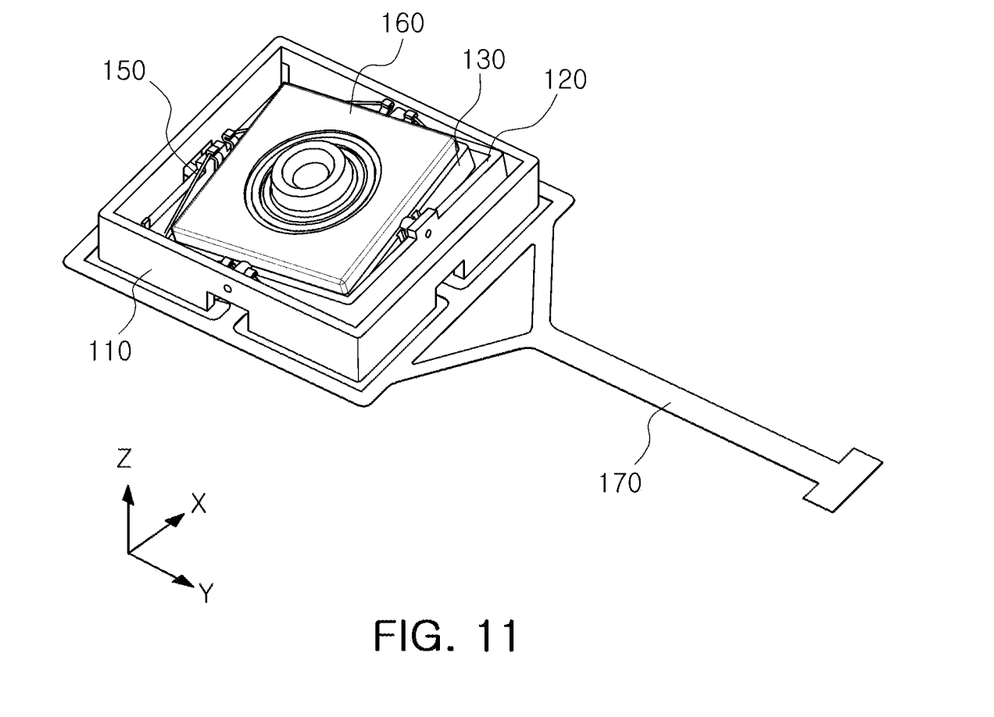

FIGS. 9 to 11 are diagrams illustrating example operations of one or more configurations of the camera module described above.

For example, referring to FIGS. 1-8 and 9, the first rotating case 120 is rotated in a first axis direction (e.g., an X-axis direction) by extension and contraction of the first driving wire 140 of the shape memory alloy.

For example, a 1-1 driving wire 141 and a 1-3 driving wire 143 of the first driving wire 140 may be contracted, and a 1-2 driving and a 1-4 driving wire 144 of the first driving wire 140 may be extended.

Accordingly, the first rotating case 120 may be rotated around the first rotation shaft 102 in a clockwise direction.

Alternatively, the 1-1 driving wire 141 and the 1-3 driving wire 143 of the first driving wire 140 are extended, and the 1-2 driving wire 142 and the 1-4 driving wire of the first driving wire 140 are compressed. Accordingly, the first rotating case 120 may be rotated about the first rotation shaft 102 in a counterclockwise direction.

Meanwhile, referring to FIGS. 1-8 and 10, the second rotating case 130 rotates in a second axis direction (e.g., a Y-axis direction), perpendicular to the first axis direction by an extension axis of the second driving wire 150.

For example, a 2-1 driving wire 151 and a 2-3 driving wire 153 of the second driving wire 150 are compressed, and a 2-2 driving wire 152 and a 2-4 driving wire 154 of the second driving wire 150 are extended. Accordingly, the second rotating case 120 is rotated around the second rotation shaft 104 (see FIG. 3) in a counterclockwise direction. Alternatively, the 2-1 driving wire 151 and the 2-3 driving wire 153 of the second driving wire 150 are extended, and the 2-2 driving wire 152 and the 2-4 driving wire 154 of the second driving wire 150 are compressed. Accordingly, the second rotating case 130 is rotated around the second rotation shaft 104 in a clockwise direction.

Referring to FIGS. 1-8 and 11, the first and second rotating cases 120 and 130 are rotated separately about a first axis and a second axis by the first and second driving wires 140 and 150.

For example, the 1-1 driving wire 141 and the 1-3 driving wire 143 of the first driving wire 140 are extended, and the 1-2 driving wire 142 and the 1-4 driving wire 144 of the first driving wire 140 are compressed. Accordingly, the first rotation case 120 is rotated about the first rotation shaft 102 in a counterclockwise direction. Alternatively, the 2-1 driving wire 151 and the 2-3 driving wire 153 of the second driving wire 150 are compressed, and the 2-2 driving wire 152 and the 2-4 driving wire 154 of the second driving wire 150 are extended. Accordingly, the second rotating case 120 is rotated about the second rotation shaft 104 (see FIG. 3) in a counterclockwise direction.

As described above, the first rotating case 120 and the second rotating case 130 may be separately rotated about the first axis and the second axis by the first and second driving wires 140 and 150, respectively.

As further described above, by rotating the first and second rotating cases 120 and 130 by the first and second driving wires 140 and 150 the driving force for rotating the first and second rotating cases 120 and 130 may be improved compared to previous approaches. Further, for example, with one or more example embodiments the pitch and roll angles, that is, the rotational angle during OIS driving, can be increased compared to previous approaches.

Still further, according to one or more example embodiments, interference by electromagnetic waves may be suppressed compared to previous approaches, while also providing for available increased pitch and roll angles, that is a rotational angle during OIS driving, compared to previous approaches.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a fixed case;
   a first rotation case configured to rotate in the fixed case around a first axis;
   a second rotation case configured to rotate in the first rotation case around a second axis, perpendicular to the first axis;
   a sub-module fixed in the second rotation case;
   a first shape memory alloy driving wire connected between an inner surface of the fixed case and an outer surface of the first rotation case; and
   a second shape memory alloy driving wire connected between an inner surface of the first rotation case and an outer surface of the second rotation case.

2. The camera module of claim 1,
   wherein one end of the first shape memory alloy driving wire is connected to a first connection member on the inner surface of the fixed case, and another end of the first shape memory alloy driving wire is connected to a second connection member on the outer surface of the first rotation case, and
   wherein one end of the second shape memory alloy driving wire is connected to a third connection member on the inner surface of the first rotation case, and another end of the second shape memory alloy driving wire is connected to a fourth connection member on the outer surface of the second rotation case.

3. The camera module of claim 2,
   wherein the first shape memory alloy wire comprises a plurality of first shape memory alloy wires and two of the first shape memory alloy driving wires are disposed to form a pair of first shape memory alloy driving wires on one surface of the first rotation case, and another two of the first shape memory alloy driving wires are disposed to form another pair of first shape memory alloy driving wires on another surface of the first rotation case, and
   wherein the second shape memory alloy wire comprises a plurality of second shape memory alloy wires and two of the second shape memory alloy driving wires are disposed to form a pair of second shape memory alloy driving wires, respectively, on each of two sides of the first rotation case adjacent to the one surface and the other surface of the first rotation case.

4. The camera module of claim 3,
   wherein the first connection member includes plural first connection members, including two of the first connection members being disposed on respective lower end portions of the inner surface of the fixed case, and another two of the first connection members being disposed on respective lower end portions of another inner surface of the fixed case, opposite the inner surface of the fixed case, and
   wherein the second connection member includes plural second connection members, including two of the second connection members being disposed on a central portion of the outer surface of the first rotation case, and another two of the second connection members being disposed on a central portion of another outer surface of the first rotation case, disposed opposite the outer surface of the first rotation case.

5. The camera module of claim 3,
   wherein the third connection member includes plural third connection members, including two of the third connection members being disposed on respective lower end portions of the inner surface of the first rotation case, and another two of the third connection members being disposed on respective lower end portions of another inner surface of the first rotation case, opposite the inner surface of the first rotation case, and
   wherein the fourth connection member includes plural fourth connection members, including two of the fourth connection members being disposed on a central portion of the outer surface of the second rotation case, and another two of the second connection members being disposed on a central portion of another outer surface of the second rotation case.

6. The camera module of claim 3,
   wherein the first connection member includes plural first connection members, including a 1-1 connection member disposed at a lower end portion of a first inner surface of the fixed case and disposed to oppose a first outer surface of the first rotation case, a 1-2 connection member is disposed on the first inner surface and spaced apart from the 1-1 connection member, a 1-3 connection member disposed at a lower end portion of a second inner surface of the fixed case and disposed to oppose a second outer surface of the first rotation case, and a 1-4 connection member is disposed on the second inner surface and spaced apart from the 1-3 connection member,
   wherein the second connection member includes plural second connection members, including a 2-1 connection member disposed in a central portion of the first outer surface of the first rotation case, a 2-2 connection member is disposed adjacent to the 2-1 connection member on the first outer surface of the first rotation case, 2-3 connection member is disposed in a central portion of the second outer surface of the first rotation case, and a 2-4 connection member is disposed adjacent to the 2-3 connection member on the second surface of the first rotation case, and wherein the first shape memory alloy driving wire includes plural first shape memory alloy driving wires, including a 1-1 shape memory alloy driving wire connected to the 1-1 connection member and the 2-1 connection member, a 1-2 shape memory alloy driving wire connected to the 1-2 connection member and the 2-2 connection member, a 1-3 shape memory alloy driving wire connected to the 1-3 connection member and the 2-3 connection member, and a 1-4 shape memory alloy driving wire connected to the 1-4 connection member and the 2-4 connection member.

7. The camera module of claim 3, wherein the third connection member includes plural third connection members, including a 3-1 connection member disposed at a lower end portion of a first inner surface of the first rotation case and disposed to oppose a first outer surface of the second rotation case, the 3-2 connection member is disposed to be spaced apart from the 3-1 connection member on the first inner surface of the first rotation case, the 3-3 connection member is disposed at a lower end portion of a second inner surface of the first rotation case and disposed to oppose a second outer surface of the second rotation case, and the 3-4 connection member is disposed to be spaced apart from the 3-3 connection member on the second inner surface of the first rotation case, wherein the fourth connection member includes plural fourth connection members, including a 4-1 connection member disposed in a central portion of the first outer surface of the second rotation case, a 4-2 connection member disposed adjacent to the 4-1 connection member on the first outer surface of the second rotation case, a 4-3 connection member disposed in a central portion of the second outer surface of the second rotation case, and a 4-4 connection member disposed adjacent to the 4-3 connection member on the second outer surface of the second rotation case, and wherein the second shape memory alloy driving wire includes plural second shape memory alloy driving wires, including a 2-1 shape memory alloy driving wire connected to the 3-1 connection member and the 4-1 connection member, a 2-2 shape memory alloy driving wire connected to the 3-2 connection member and the 4-2 connection member, a 2-3 shape memory alloy driving wire connected to the 3-3 connection member and the 4-3 connection member, and a 2-4 shape memory alloy driving wire connected to the 3-4 connection member and the 4-4 connection member.

8. The camera module of claim 2, further comprising a flexible circuit board connected to the first connection member, the second connection member, the third connection member, and the fourth connection member, and includes an opening for preventing interference when the first or second rotation cases are controlled to rotate.

9. The camera module of claim 1, wherein the first rotation case is disposed on a first rotation shaft of the fixed case, and the second rotation case is disposed on a second rotation shaft of the first rotation case.

10. The camera module of claim 9, wherein the first rotation case includes a first protrusion provided with a first installation groove in which the first rotation shaft is disposed, and the second rotation case includes a second protrusion provided with a second installation groove in which the second rotation shaft is disposed.

11. The camera module of claim 10, wherein the first rotation case includes a through-hole, and the second rotation shaft passes through the through-hole.

12. The camera module of claim 1, wherein the sub-module comprises a housing having an internal space, and a lens holder disposed in the housing.

13. The camera module of claim 12, wherein the lens holder is configured to change lens elevations within the housing.

14. A camera module, comprising:
a fixed case having a plurality of first connection members respectively disposed on two opposing inner surfaces;
a first rotation case configured to rotate in the fixed case around a first axis, having a plurality of second connection members on surfaces of the first rotation case that respectively oppose the plurality of first connection members, and having a plurality of third connection members including plural third connection members that are disposed on other surfaces of the first rotation case;
a second rotation case configured to rotate in the first rotation case around a second axis, perpendicular to the first axis, and having a plurality of fourth connection members disposed on surfaces that respectively oppose the third connection members;
a sub-module fixedly disposed on an inner surface of the second rotation case;
a plurality of first shape memory alloy driving wires that respectively connect the plurality of first connection members and the plurality of second connection members; and
a plurality of second shape memory alloy driving wires that respectively connect the plurality of third connection members and the plurality of fourth connection members.

15. The camera module of claim 14,
wherein two of the first shape memory alloy driving wires are disposed to form a pair of first shape memory alloy driving wires on one surface of the first rotation case, and another two of the first shape memory alloy driving wires are disposed to form another pair of first shape memory alloy driving wires on another surface on an opposite side of the first rotation case than the one surface of the first rotation case, and
wherein two of the second shape memory alloy driving wires are disposed to form a pair of second shape memory alloy driving wires, respectively, on each of two sides of the first rotation case adjacent to the one surface and the other surface of the first rotation case.

16. The camera module of claim 14, further comprising a flexible circuit board respectively connected to the plurality of first connection members, the plurality of second connection members, the plurality of third connection members, and plurality of fourth connection members, and includes an opening for preventing interference when the first or second rotation cases are controlled to rotate.

17. The camera module of claim 14, wherein the first rotation case is disposed on a first rotation shaft of the fixed case, and the second rotation case is disposed on a second rotation shaft of the first rotation case.

18. A camera module, comprising:
a first case having a first rotation member configured in a first axis direction;

a second case having a second rotation member configured in a different second axis direction;

a third case comprising a lens sub-module; and plural shape memory alloy driving wires, including a first shape memory alloy wire configured to control varied rotation of the second case using the first rotation member, and a second shape memory alloy wire configured to control varied rotation of the third case using the second rotation member, wherein the first shape memory alloy wire controls a rotational orientation of the second case with respect to the first case about the first rotation member, and the second shape memory alloy wire controls a rotational orientation of the third case with respect to the second case about the second rotation member, and wherein the first shape memory alloy wire comprises a plurality of first shape memory alloy wires that respectively connect first connection members arranged on an inner side of the first case to second connection members arranged on an outer side of the second case.

19. The camera module of claim 18, further comprising a flexible circuit board configured to provide electrical changes to the first shape memory alloy wires that correspondingly change a rotational orientation of the second case with respect to the first case about the first rotation member, and configured to provide electrical changes to the second shape memory alloy wire that correspondingly changes rotational orientation of the third case with respect to the second case about the second rotation member.

20. The camera module of claim 18, wherein the second shape memory alloy wire comprises a plurality of second shape memory alloy wires that respectively connect third connection members arranged on an inner side of the second case to fourth connection members arranged on an outer side of the third case.

21. A camera module, comprising:

a first case having a first rotation member configured in a first axis direction, and a first connection member disposed on an inner side of the first case;

a second case having a second rotation member configured in a different second axis direction, a second connection member disposed on an outer side of the second case and opposing the first connection member, and a third connection member disposed on an inner side of the second case;

a third case comprising a lens sub-module, and a fourth connection member disposed on an outer side of the third case and opposing the third connection member; and respective shape memory alloy wires that connect the first connection member to the second connection member, and connect the third connection member to the fourth connection member.

22. The camera module of claim 21, wherein the first connection member is disposed on two of a total of four inner sides of the first case, the second connection member is disposed on two outer sides of the second case, the third connection member is disposed on two inner sides of the second case, and the fourth connection member is disposed on two outer sides of the third case.

23. The camera module of claim 21, further comprising a flexible circuit board connected to the first connection member, the second connection member, the third connection member, and the fourth connection member.

24. The camera module of claim 23, wherein the flexible circuit board further comprises an opening for preventing interference when the second or third rotation cases are controlled to rotate with respect to the first case.

* * * * *